Feb. 7, 1956   L. C. TRUESDELL   2,733,802
METERING DEVICE
Filed Oct. 24, 1950   2 Sheets-Sheet 1

INVENTOR.
LEONARD C. TRUESDELL
BY John J. Pederson
HIS ATTORNEY

Feb. 7, 1956  L. C. TRUESDELL  2,733,802
METERING DEVICE

Filed Oct. 24, 1950  2 Sheets-Sheet 2

LEONARD C. TRUESDELL
INVENTOR.

BY *John J. Pederson*

HIS ATTORNEY

United States Patent Office 2,733,802
Patented Feb. 7, 1956

2,733,802

METERING DEVICE

Leonard C. Truesdell, Winnetka, Ill.

Application October 24, 1950, Serial No. 191,868

14 Claims. (Cl. 194—9)

This invention relates to metering devices and more particularly to coin-controlled metering devices for regulating the supply of electric current to an electrical appliance.

With the advent of large scale installment buying, the problems associated with installment payments have greatly increased, and numerous schemes have been evolved to render such payments as painless as possible and to reduce the carrying charges borne by the purchasers. One of the more popular of these schemes involves the use of a coin-controlled device for metering the current supply to permit operation of the appliance from day to day so long as regular payments are made. Thus, a consumer may purchase an electric refrigerator or a television receiver, for example, by making a small down payment and by inserting a predetermined sum, such as 25¢ a day, in a metering device which is installed with the appliance; if at any time the payments are allowed to lapse, the metering device operates to disconnect the appliance from the power source. The payment rate is established in accordance with the purchase contract to permit payment to be correlated with use by the purchaser; at the same time, the necessary paper work of the vendor is lessened so that carrying charges may be reduced.

Such coin-controlled metering devices as have been proposed, however, are subject to several limitations that are undesirable as a practical matter. In the first place, no convenient provision is made for insuring that back payments will be collected in the event that the appliance is allowed to stand idle for a period of several days. This consideration is not particularly troublesome when such a metering device is used in connection with the sale of an appliance such as an electric refrigerator or the like which requires a continuous supply of electric current, but the problem becomes much more vexing in other cases, as for example in the sale of a television receiver or the like, where the appliance is operated only at the will of the consumer. Obviously, if payments proceed uninterrupted in accordance with a prearranged schedule, the carrying charges borne by the purchaser may be further reduced.

Further, most prior art coin-controlled metering devices of the type under consideration are not readily adaptable to adjustment of the installment rate to the circumstances surrounding individual sales. For example, it may be desirable to set the metering device to collect 50¢ a day for the purchase of a $500.00 electric refrigerator, while in the case of a $250.00 television receiver, a payment of 25¢ a day may be ample. Known metering devices may only be adjusted to different collection rates by substituting different mechanical linkages, or at least by the insertion of extraneous parts. This prevents complete standardization of the metering units and results in a relatively high manufacturing cost.

It is an important object of the present invention to provide a new and improved coin-controlled metering device which avoids one or more of the disadvantages found in prior-art devices.

It is a further object of the invention to provide a coin-controlled metering apparatus which insures that the agreed collection schedule will be observed even though the purchaser may permit several days to elapse without making any payments.

Yet another object of the invention is to provide an improved and flexible coin-controlled metering device in which the installment rate is readily adjustable without the substitution of mechanical linkages or the insertion of extraneous parts, in order to accommodate a wide range of installment rates while permitting standardization of the metering unit.

In accordance with a principal feature of the invention, a new and improved control apparatus for metering electric power comprises an electrical switch, a switch-operating member associated with the switch, and an integrator. Clutch means are provided for releasably coupling the switch-operating member to the integrator. Means are provided for releasably locking the switch-operating member in a home position in which the switch is operated, and a tripping device is operatively associated with the integrator for releasing the locking means to permit actuation of the switch-operating member by the integrator. The integrator is continuously driven along a predetermined path in a first direction by means of a timing mechanism and coin-operated means are provided for driving the integrator along an incremental portion of the aforementioned path in an opposite direction.

In accordance with another feature of the invention, additional means are provided for preadjusting the length of the incremental portion of the operating path over which the integrator is driven for each coin deposited to any desired value within a continuous range.

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1:
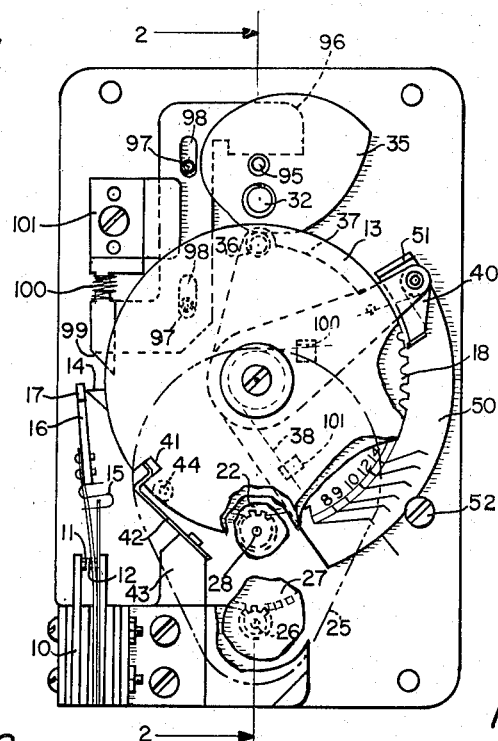
Figure 1 is an elevational view of an electric metering device constructed in accordance with the invention.

As illustrated in Figure 1, an electric metering device constructed in accordance with the invention comprises a normally closed electrical switch 10 provided with contact terminals 11 and 12 to be connected in series with one of the power-supply conductors to the electric refrigerator, television receiver, or other electrical appliance to which the metering device is temporarily and inconspicuously attached. The actuation of these terminals and the operation of the metered apparatus are under the control of a switch-operating member 13, in the form of a disc having a peripheral projection 14, associated with switch 10. This switch may be of a well-known type arranged to be biased to its closed position by means of a spring 15 to which is attached an extension 16 having a portion 17 adapted to be engaged by projection 14 on a switch-operating member 13 during any operating interval in which the switch-operating member assumes a predetermined reference or home position (shown in Figure 1). Whenever projection 14 of switch-operating member 13 engages portion 17 of switch spring extension member 16, contacts 11 and 12 are separated, switch 10 is electrically opened, and the controlled apparatus is rendered inoperable.

Figure 2:
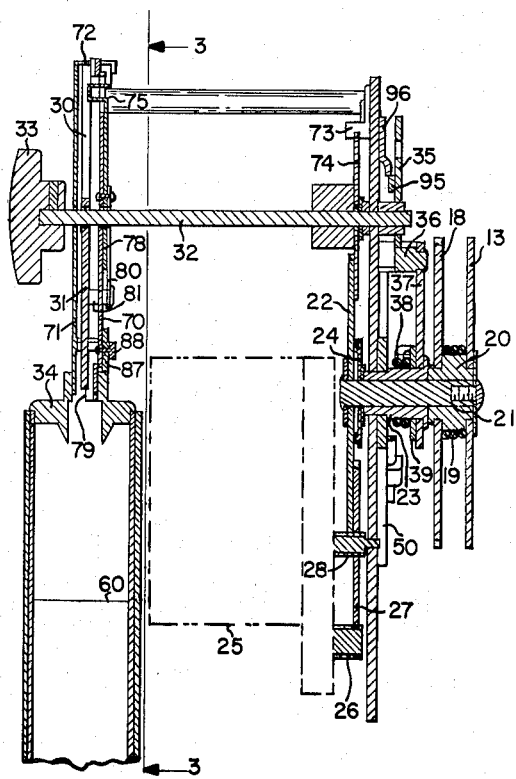
Figure 2 is a sectional view taken along the line 2—2 of Figure 1.

Also included in the metering apparatus is an integrator 18, which may conveniently assume the form of a simple gear provided with peripheral teeth. As best shown in Figure 2, integrator 18 is coaxial with switch-operating member 13 and is friction-coupled thereto by means of a coil spring 19. Switch-operating member 13 is loosely supported on a bushing 20 to which integrating member 18 is fixed, and bushing 20 is rotatably mounted on a central shaft 21. A drive wheel 22 fixedly mounted at the opposite end of shaft 21 drives integrator 18 through a second bushing 23 slidably mounted on shaft 21, bushings 20 and 23 being maintained in axial frictional engagement with one another by means of a spring member 24 bearing on drive wheel 22. An electric clock motor 25, or other suitable timing mechanism, continuously rotates a geared shaft 26 which actuates drive wheel 22 by means of an idler gear 27 and a second geared shaft 28. Idler gear 27 and geared shaft 28 constitute a reduction gearing system.

As previously stated and as illustrated in Figure 1, when projection 14 on switch-operating member 13 engages portion 17 of switch spring extension member 16, switch 10 is opened and no power is supplied to the appliance to which the metering device is attached. In order to actuate the switch-operating member and displace it from the reference position of Figure 1 to close switch 10, a coin (for example, a 25¢ piece) is inserted in a coin-receiving slot or recess 30 (Figures 2 and 3) in a coin wheel 31 mounted on a shaft 32. An operating knob 33 fixed to the end of shaft 32 is then rotated one complete revolution, the coin being deposited at the end of one-half revolution in a removable coin receptacle or bank 34 to be hereinafter described in greater detail. As may best be seen from Figure 1, rotation of shaft 32 causes an eccentric cam 35 to rotate. Cam 35 engages a stud 36 on a cam-follower member 37 which is rotatably supported on bushing 23. A spring 38, encircling bushing 23 and bearing outwardly against stops 100 and 101 mounted respectively on cam follower 37 and on an adjusting plate 50 to be described hereinafter, bears on a washer 39 in order to permit stud 36 to follow the peripheral surface of cam 35 as the cam is rotated. A pawl 40, pivotally secured to cam-follower member 37, is spring-biased into slanted engagement with the teeth on the periphery of integrator wheel 18 in such a manner that rotation of shaft 32 and cam 35 in a counterclockwise direction as viewed in Figure 1 actuates cam-follower member 37 and pawl 40 to drive integrator wheel 18 a predetermined selected distance in a clockwise direction; the slanted approach of pawl 40 to the teeth of integrator 18 and the spring-bias applied to pawl 40 insure disengagement of the pawl from the integrator during the return stroke.

Figure 3:
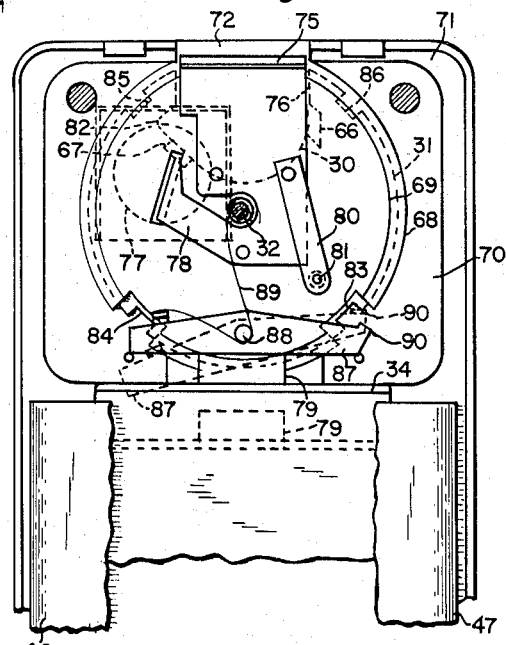
Figure 3 is a sectional view taken along the line 3—3 of Figure 2.

The coin slot mechanism is best illustrated in Figures 2 and 3, in which coin-receiving disc 31 is shown rotatably mounted on shaft 32 between a pair of cover plates 70 and 71, the central portion of plate 70 being raised as shown by lines 68 and 69 to form a housing which accommodates disc 31. Coin-receiving disc 31 is normally maintained in the illustrated position with the coin-receiving slot 30 in register with a chute 72 defined by the spacing of plates 70 and 71. To this end, clockwise rotation of shaft 32 (as shown in Figure 3) is prevented by means of a pawl 73 (Figure 2) which engages a ratchet wheel 74 supported on shaft 32, although the ratchet and pawl do not arrest rotation in the opposite sense. Counterclockwise rotation of shaft 32 (as viewed in Figure 3) is normally restrained by means of a spring member 75 of copper or other resilient material which is supported by cover plate 70 and normally engages an edge 76 of coin-receiving slot 30. When a coin is inserted into slot 30 through chute 72, spring member 75 is forced upwardly from the plane of the drawing by the coin and disengages the edge 76 of slot 30, freeing coin wheel 31 for counterclockwise rotation.

As coin-receiving disc 31 is rotated in a counterclockwise direction from its normal position, slot 30 is brought into register with a hole 77 in cover plate 71. Hole 77 is smaller in diameter than the coin for which the meter is designed, and a second spring member 78 is provided to eject coins of a size smaller than the required coin through hole 77. After rejection of an undersize coin, further counterclockwise rotation of coin-receiving disc 31 may be effected only until the edge of spring 78 engages an edge of disc 31 adjacent coin-receiving slot 30. Moreover, the configuration of cam 35 is such that pawl 40 is not driven to actuate integrator 18 until after coin-receiving disc 31 has advanced beyond this limiting position. In this manner, the possibility of "short-changing the meter" by inserting undersize coins is obviated.

In order to permit coin-receiving disc 31 to be returned to its normal position after rejection of an undersize coin, a bevelled notch 67 is provided at the edge of slot 30 to lift spring 78 as disc 31 is rotated in a clockwise direction, and ratchet wheel 74 may be provided with a gap or discontinuity in its peripheral teeth to permit clockwise rotation of the coin mechanism over the small part of a revolution required to re-register slot 30 with chute 72.

If a coin of the proper size has been inserted, full counterclockwise rotation of the coin wheel 31 is permitted. When the slot 30 becomes juxtaposed with the coin chute 79 of the bank or receptacle 34, the coin falls and is deposited into the bank, and the shaft 32 is rotated further in a counterclockwise direction until one full revolution has been completed. After one full revolution, spring 75 again engages edge 76 of the now-empty coin slot 30, so that further rotation of shaft 32 is precluded. A spring member 80 supported by cover plate 70 is provided with a stud 81 extending between cover plate 70 and coin-receiving disc 31; stud 81 engages an edge portion 82 of slot 30 at the moment a coin is deposited into the bank 34, in order to prevent the coin from being carried past chute 79 of bank 34 in the event that the meter should be inverted or by rapid rotation of shaft 32 when the meter is in an upright position. After the coin has been deposited in the bank, stud 81 is lifted by a bevelled notch 66 adjacent coin-receiving slot 30 to permit further rotation of disc 31 to its normal position.

The coin receptacle or bank 34 is slidably supported in the meter casing between a pair of channel members 46 and 47 and is removable to permit the installment purchaser to present it to a central collection station at agreed intervals, so that it is unnecessary for collection to be made at the home or other place where the meter is installed. Provision must therefore be made to prevent setting of the meter at times when the bank has been removed; otherwise, the consumer would be able to provide for continuous operation by repeated insertion of a single coin which could be retrieved and reinserted after each rotation of the operating shaft 32. To this end, coin-receiving disc 31 is provided with peripheral notches 83—86, and a locking bar 87 is supported on a shaft 88 to be engaged by coin chute 79 of bank 34. Locking bar 87 is biased for counterclockwise rotation by means of a spring 89 in such a way that, when bank 34 is withdrawn, a catch 90 formed on one end of the bar is urged into engagement with notch 83 to lock coin-receiving disc 31 against movement, as indicated in dotted lines in Figure 3. Notches 84—86 are provided to prevent further rotation of coin-receiving disc 31 if bank 34 should be removed after partial rotation of shaft 32. On the other hand, when the bank 34 is properly inserted, as shown in full lines, chute 79 engages locking bar 87 and rotates it about shaft 88, releasing catch 90 to permit rotation of disc 31.

Provision is also made to insure that continuous operation of the metered apparatus cannot be obtained by inserting a single coin and rotating shaft 32 only far enough to cause pawl 40 to engage the peripheral teeth of integrator wheel 18, thereby jamming the meter in such a manner as to prevent integrator 18 from being driven in a counterclockwise direction by clock mechanism 25. To this end, as best shown in Figure 1, a stud 95 on cam 35 is arranged to engage a member 96 which is slidably mounted on the support plate by means of pins 97 and slotted holes 98. Member 96 is provided with a projection 99 adapted to engage portion 17 of switch spring extension member 16 whenever member 96 is permitted to move downwardly. Member 96 is biased in a downward direction by means of a compression spring 100 disposed between projection 99 and a spring support block 101. Whenever shaft 32 is rotated, stud 95 on cam 35 is moved out of engagement with member 96, and portion 99 is forced into engagement with switch spring extension member 16. Switch 10 is thereby opened until stud 95 again engages member 96 at the end of one complete revolution of shaft 32.

Figure 4:
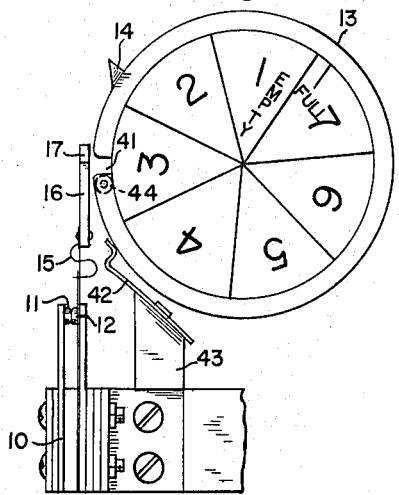
Figures 4 and 5 are fragmentary views illustrating one feature of the invention.

In accordance with a principal feature of the invention, switch-operating member 13 (Figure 1) is provided with a peripheral notch 41, and a locking spring 42 is supported on a bracket 43 to engage notch 41 and lock the switch-operating member in a predetermined position (as shown in Figure 1) in which switch 10 is electrically open. A tripping device or spring-lifting stud 44 projects from integrator 18. Consequently, when integrator 18 is rotated in a clockwise direction in response to insertion of a coin in slot 30 and rotation of knob 33, stud 44 may engage locking spring 42, lifting it out of notch 41 and permitting the switch-operating member also to rotate in a clockwise direction. Clockwise rotation of switch-operating member 13 causes projection 14 to move out of engagement with portion 17 of switch spring extension member 16, permitting contacts 11 and 12 of switch 10 to close, as shown in Figure 4. In this manner, electric power is supplied to the appliance connected to the metering device.

As has been previously mentioned, clock motor 25 drives wheel 22 in a counterclockwise direction at a predetermined constant speed. Since integrator 18 is friction-coupled to wheel 22 by means of bushings 20 and 23 and spring member 24, and since switch-operating member 13 is friction-coupled to integrator 18 by means of compression spring 19, switch-operating member 13 is also rotated counterclockwise, until such time as projection 14 engages portion 17 of switch spring extension member 16, and locking spring 42 engages notch 41, locking the switch-operating member in the switch-open position (Figure 1).

During the paid-up interval, switch contacts 11 and 12 are closed, and the appliance may be operated at will by the purchaser; at the expiration of the paid-up interval, the electric power is cut off from the appliance. In order to provide for further operation of the appliance, it is necessary for the consumer to insert one or more additional coins in the metering device to operate integrator 18 and switch-operating member 13 in the manner already described, thereby providing for a further period of operation. If the consumer neglects to insert additional coins in accordance with the prescribed schedule of installment payments, the metering device effectively registers the deficiency which must be made up before switch 10 can be closed to permit a further supply of electric power as will now be explained.

Figure 5:
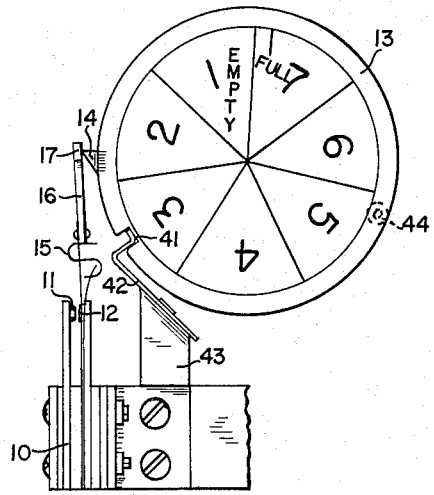

In the event that the purchaser neglects to inert one or more coins after switch 10 is opened, integrating wheel 18 continues to be driven in a counterclockwise direction by clock mechanism 25, but switch-operating member 13 is restrained against further counterclockwise rotation by the engagement of locking spring 42 with notch 41. Such further counterclockwise rotation of the integrating wheel 18 is permitted by the friction-coupling between integrator 18 and switch-operating member 13. Thus, spring-lifting stud 44 is continuously rotated away from spring 42, as shown in Figure 5. When the purchaser desires to resume operation of the applicance, it is then necessary that a sufficient number of coins be deposited in receptacle 34 to rotate integrator 18 in a clockwise direction until spring-lifting stud 44 engages locking spring 42; during this rotation of integrator 18, switch-operating member 13 is prevented from rotating by virtue of the locking arrangement. After spring-lifting stud 44 has been brought into engagement with spring 42, the insertion of additional coins and rotation of shaft 32 causes stud 44 to lift spring 42 out of notch 41, permitting the friction-coupling between integrator 18 and switch-operating member 13 to become effective, and switch-operating member 13 is driven in a clockwise direction. Thus, projection 14 is moved out of engagement with portion 17 of switch spring extension member 16, and switch 10 is closed so that power is supplied to the appliance.

It is apparent from the foregoing description and from the drawings that several coin-inserting cycles are required to effect a single complete revolution of integrator 18. In a preferred embodiment, clock motor 25 and its associated reduction gearing system are arranged to drive integrator 18 in a reverse direction at a speed of one revolution per week. One or more coins may be deposited at any time to extend the paid-up operating interval; however, care should be taken to avoid inserting a greater number of coins than that required to effect one complete revolution of integrator 18 from the position indicated in Figure 1, since further payments not only will not further extend the operating interval, but will actually reduce its duration by nearly a week. To enable the purchaser to determine at a glance the amount of unexpired paid-up time remaining, switch-operating member 13 may be provided with suitable indicia viewable through a stationary window in the meter housing (not shown). Thus as shown in Figures 4 and 5, a convenient means of direct calibration may comprise inscriptions dividing the surface of switch-operating member 13 into seven equal sectors each of which is suitably marked to indicate the number of days remaining in the paid-up operating interval when in register with the viewing window.

It is also apparent that the meter is only capable of registering payment-deficiencies of duration less than or equal to that represented by one complete revolution of the integrator, since spring-lifting stud 44 prevents further reverse rotation of integrator 18 by engaging locking spring 41. As a practical matter, however, payment-deficiencies of more than a week are seldom encountered.

In accordance with another feature of the invention, provision is made to permit ready adjustment of the duration of the operating interval for each coin deposited to any value within a predetermined continuous range. To this end, an adjusting plate 50 is rotatably mounted on shaft 21. An upturned portion 51 of adjusting plate 50 engages the radially extending portion of cam-following member 37 to which pawl 40 is affixed. A locking screw 52 is provided for securing plate 50 in any desired position.

When the adjusting plate 50 is locked in the position shown in Figure 1, cam-following member 37 is biased into a predetermined space relation with respect to cam 35 by means of spring 38. In this position, the rotation of cam 35 over one complete revolution in a counterclockwise direction causes pawl 40 to drive integrator 18 in a clockwise direction for a distance determined by the proportion of the peripheral cam surface which engages cam-follower 37. If locking screw 52 is loosened and adjusting plate 50 is rotated in a clockwise direction, the distance between cam-follower 37 and shaft 32 is increased; when a coin is inserted in slot 30 and shaft 32 is rotated one complete revolution, a smaller proportion of the peripheral surface of cam 35 engages cam-follower 37, so that pawl 40 is driven for a shorter distance. Thus, by providing for ready adjustment of the distance between shaft 32 and cam-follower 37, the metering device is adapted to preadjustment of the payment rate to any value within a continuous range. Adjusting plate 50 may be calibrated, as indicated in Figure 1, to indicate directly the number of coins required to effect one complete revolution of switch-operating member 13.

Figure 6:
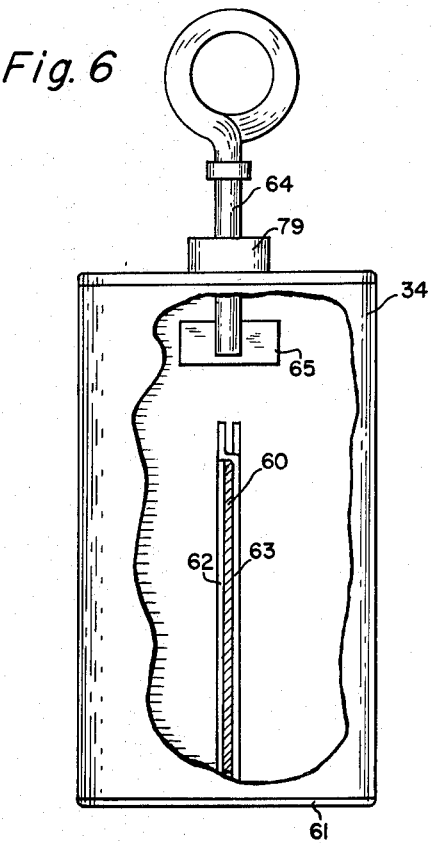
Figure 6 is a view, partly cut away and partly in section, of another portion of the device of Figure 1.

The construction of the coin receptacle or bank 34 is shown in Figure 6. Bank 34 includes an outer casing provided with a central partition 60 extending vertically of the receptacle and dividing it into two coin-receiving portions. A closure member 61, located at the bottom of the receptacle 34, is provided with a pair of upwardly-extending resilient spring members 62 and 63 each provided with an offset upper end portion adapted to overlap the upper end of partition 60, thus effectively preventing access to the interior of the receptacle for the removal of coins by unauthorized persons not possessed of the proper key.

A simple key 64, comprising a central shank having a transverse metal plate 65 of generally rectangular shape, may be used to release closure member 61 from the body of the receptacle 34. The bank may be unlocked by merely inserting key 64 in the coin chute until transverse member 65 engages the upper end of partition 60 between spring members 62 and 63. Counterclockwise rotation of the key, as viewed from the top end of the bank in Figure 6, for slightly more than one-quarter revolution forces the offset upper portions of resilient springs 62 and 63 out of engagement with the upper end of partition 60, permitting closure member 61 to be withdrawn from the bottom of the receptacle and providing ready access to the coins which have been deposited in the bank.

Thus, the present invention provides a new and improved electric metering device, particularly useful in the installment sale of electrical appliances such as electric refrigerators, television receivers, and the like. Provision is made to insure collection of back payments in the event that the purchaser neglects to insert coins regularly, and the payment rate is readily adjustable to accommodate a wide variety of installment contracts. The coin receptacle is removable from the metering device, so that the carrying charges to the purchaser may be reduced by employing a centralized collection system. Moreover, a purchaser may insure continuous operation of the electrical appliance throughout the interval during which the bank is removed, but the metering device may not be operated unless the bank is in a proper position to receive the coins.

It is apparent that rectilinear elements may be employed as the switch-operating member and the integrator, although it is preferred for compactness and simplicity to employ rotational elements to perform these functions, in the manner shown and described in connection with the illustrated embodiment.

While a particular embodiment of the invention has been shown and described, it is apparent that various changes and modifications may be made, and it is therefore contemplated in the appended claims to cover all such changes and modifications as fall within the true spirit and scope of the invention.

I claim:

1. An electric-power metering device comprising: an electrical switch adapted to be connected in the power supply circuit to an associated electrical apparatus; a switch-operating member operatively associated with said switch; an integrator; clutch means releasably coupling said integrator to said switch-operating member; means for releasably locking said switch-operating member in a home position in which said switch is operated; a tripping device operatively associated with said integrator for releasing said locking means to permit actuation of said switch-operating member by said integrator; timing mechanism for continuously actuating said integrator along a predetermined path in a first direction; and coin-operated means for selectively actuating said integrator along an incremental portion of said path in a direction opposite to said first direction.

2. An electric-power metering device comprising: an electrical switch adapted to be connected in the power supply circuit to an associated electrical apparatus; a rotary switch-operating member comprising a disc provided with a peripheral projection for operating said switch whenever said switch-operating member assumes a home position; a rotary integrator coaxially supported with respect to said switch-operating member; clutch means releasably coupling said integrator to said switch-operating member; means for releasably locking said switch-operating member in said home position; a tripping device operatively associated with said integrator for releasing said locking means to permit actuation of said switch-operating member by said integrator; timing mechanism for continuously actuating said integrator along a predetermined path in a first direction; and coin-operated means for selectively actuating said integrator along an incremental portion of said path in a direction opposite to said first direction.

3. An electric-power metering device comprising: an electrical swtich adapted to be connected in the power supply circuit to an associated electrical apparatus; a switch-operating member operatively associated with said switch and provided with a recess; an integrator; clutch means releasably coupling said integrator to said switch-operating member; a locking spring for releasably engaging said recess to lock said switch-operating member in a home position in which said switch is operated; a tripping stud projecting from said integrator for releasing said locking spring from said recess to permit actuation of said switch-operating member by said integrator; timing mechanism for continuously actuating said integrator along a predetermined path in a first direction; and coin-operated means for selectively actuating said integrator along an incremental portion of said path in a direction opposite to said first direction.

4. An electric-power metering device comprising: an electrical switch adapted to be connected in the power supply circuit to an associated electrical apparatus; a switch-operating member operatively associated with said switch; an integrator; means for friction-coupling said integrator to said switch-operating member; means for releasably locking said switch-operating member in a home position in which said switch is operated; a tripping device operatively associated with said integrator for releasing said locking means to permit actuation of said switch-operating member by said integrator; timing mechanism for continuously actuating said integrator along a predetermined path in a first direction; and coin-operated means for selectively actuating said integrator along an incremental portion of said path in a direction opposite to said first direction.

5. An electric-power metering device comprising: an electrical switch adapted to be connected in the power supply circuit to an associated electrical apparatus; a switch-operating member operatively associated with said switch; an integrator; means including a compression spring for friction-coupling said integrator to said switch-operating member; means for releasably locking said switch-operating member in a home position in which said switch is operated; a tripping device operatively associated with said integrator for releasing said locking means to permit actuation of said switch-operating member by said integrator; timing mechanism for continuously actuating said integrator along a predetermined path in a first direction; and coin-operated means for selectively actuating said integrator along an incremental portion of said path in a direction opposite to said first direction.

6. An electric-power metering device comprising: an electrical switch adapted to be connected in the power supply circuit to an associated electrical apparatus; a switch-operating member operatively associated with said switch; an integrator; clutch means releasably coupling said integrator to said switch-operating member; means for releasably locking said switch-operating member in a home position in which said switch is operated; a tripping device operatively associated with said integrator for releasing said locking means to permit actuation of said switch-operating member by said integrator; timing mechanism for continuously actuating said integrator along a predetermined path in a first direction; and rotary coin-operated means including an eccentric cam, a cam follower spring-biased into engagement with said cam during at least a part of each cam-rotating cycle, and a pawl supported by said cam follower and spring-biased into engagement with said integrator for selectively actuating said integrator along an incremental portion of said path in a direction opposite said first direction.

7. An electric-power metering device comprising: an electrical switch adapted to be connected in the power supply circuit to an associated electrical apparatus; an integrator operatively associated with said switch; timing mechanism for continuously actuating said integrator along a predetermined path in a direction toward a home position in which said switch is operated; coin-operated mechanism for selectively actuating said integrator in a direction away from said home position; and an auxiliary switch-operating member responsive to actuation of said coin-operated mechanism for maintaining said switch in an operated condition during operation of said coin-operated mechanism.

8. An electric-power metering device comprising: an electrical switch adapted to be connected in the power supply circuit to an associated electrical apparatus; an integrator operatively associated with said switch; timing mechanism for continuously actuating said integrator along a predetermined path in a direction toward a home position in which said switch is operated; coin-operated mechanism including a cam, a cam follower operatively associated with said cam and a driving member actuatable by said cam follower for selectively actuating said integrator in a direction away from said home position; an auxiliary switch-operating member; and means supported by said cam for actuating said auxiliary switch-operating member to maintain said switch in an operated condition during operation of said coin-operated mechanism.

9. An electric-power metering device comprising: a normally closed electrical switch; a rotary switch-operator comprising a disc provided with a peripheral projection for opening said switch whenever said switch-operator assumes a home position and further provided with a peripheral notch; a locking spring adapted to engage said peripheral notch and releasably lock said switch-operator in said home position; a rotary integrating wheel coaxial with said switch-operator and having peripheral teeth; a tripping stud projecting from said integrating wheel for releasing said locking spring from said notch to permit closing of said switch; means including a compression spring for friction-coupling said switch-operator to said integrating wheel; timing mechanism for continuously actuating said integrating wheel along a predetermined path in a direction toward said home position; a rotary coin-operated mechanism including an eccentric cam having an irregular peripheral surface, a cam follower including a stud spring-biased into engagement with said peripheral cam surface during at least a part of each cam-rotating cycle, and a pawl supported by said cam follower and spring-biased into engagement with said teeth of said integrating wheel for actuating said integrating wheel along an incremental portion of said path in a direction away from said home position; and an adjusting plate for moving said cam follower relative to said cam to adjust the length of the integrator-actuating stroke of said pawl for each cam rotation.

10. An electric-power metering device comprising: an electrical switch having an open condition and a closed condition and adapted to be connected in the power supply circuit of an associated electrical apparatus; a switch-operating member having a home position in which said switch assumes one of said conditions and movable away from said home position to cause said switch to assume the other of said conditions; means for releasably locking said switch-operating member in said home position, integrating means movable along a predetermined path and operable to release said locking means upon traversing a reference portion of said path; means normally coupling said integrating means to said switch-operating member for driving said member except when it is locked in said home position but permitting independent movement of said integrating means along other portions of said path whenever said switch-operating member is locked in said home position; means for continuously moving said integrating means in a predetermined direction along said path; and means for selectively moving said integrating means along said path in a direction opposite to said predetermined direction.

11. An electric-power metering device comprising: an electrical switch having an open condition and a closed condition and adapted to be connected in the power supply circuit of an associated electrical apparatus; a switch-operating member having a home position in which said switch assumes one of said conditions and movable away from said home position to cause said switch to assume the other of said conditions; means for releasably locking said switch-operating member in said home position; integrating means including a tripping device movable along a predetermined path and operable to release said locking means upon traversing a reference portion of said path; means normally coupling said integrating means to said switch-operating member for driving said member except when it is locked in said home position but permitting independent movement of said tripping device along other portions of said path whenever said switch-operating member is locked in said home position; means for continuously actuating said integrating means to move said tripping device in a predetermined direction along said path; and means for selectively actuating said integrating means to move said tripping device along an incremental portion of said path in a direction opposite to said predetermined direction.

12. An electric-power metering device comprising: an electrical switch having an open condition and a closed condition and adapted to be connected in the power supply circuit of an associated electrical apparatus; a switch-operating member having a home position in which said switch assumes one of said conditions and movable away from said home position to cause said switch to assume the other of said conditions; means for releasably locking said switch-operating member in said home position; integrating means including a tripping device movable along a predetermined path and operable to release said locking means upon traversing a reference portion of said path in a first direction; means normally coupling said integrating means to said switch-operating member for driving said member except when it is locked in said home position but permitting independent movement of said tripping device along other portions of said path whenever said switch-operating member is locked in said home position; means for continuously actuating said integrating means to move said tripping device in a direction opposite to said first direction along said path; and means for selectively actuating said integrating means to move said tripping device along an incremental portion of said path in said first direction.

13. An electric-power metering device comprising: an electrical switch having an open condition and a closed condition and adapted to be connected in the power supply circuit of an associated electrical apparatus; a switch-operating member having a home position in which said switch assumes one of said conditions and movable away from said home position to cause said switch to assume the other of said conditions; means for releasably locking said switch-operating member in said home position; integrating means including a tripping device movable along a predetermined path and operable to release said locking means upon traversing a reference portion of said path; slip-clutch means normally coupling said integrating means to said switch-operating member for driving said member except when it is locked in said home position but permitting independent movement of said tripping device along other portions of said path whenever said switch-operating member is locked in said home position; means including a timing mechanism for continuously actuating said integrating means to move said tripping device in a predetermined direction along said path; and coin-operated means for selectively actuating said integrating means to move said tripping device along an incremental portion of said path in a direction opposite to said predetermined direction.

14. An electric-power metering device comprising: an electrical switch having an open condition and a closed condition and adapted to be connected in the power supply circuit of an associated electrical apparatus; a switch-operating member having a home position in which said switch assumes one of said conditions and movable away from said home position to cause said switch to assume the other of said conditions; means for releasably locking said switch-operating member in said home position; integrating means including a tripping device movable along a predetermined path and operable to release said locking means upon traversing a reference portion of said path; means normally coupling said integrating means to said switch-operating member for driving said member except when it is locked in said home position but permitting independent movement of said tripping device along other portions of said path whenever said switch-operating member is locked in said home position; means for continuously actuating said integrating means to move said tripping device in a predetermined direction along said path; means for selectively actuating said integrating means to move said tripping device along an incremental portion of said path in a direction opposite to said predetermined direction; and means for varying the length of said incremental portion.

References Cited in the file of this patent

UNITED STATES PATENTS

| | | |
|---|---|---|
| 467,146 | Beasley | Jan. 19, 1892 |
| 547,544 | Gilman | Oct. 8, 1895 |
| 626,298 | Phillips | June 6, 1899 |
| 925,547 | Wilson | June 22, 1909 |
| 1,561,707 | Du Grenier | Nov. 17, 1925 |
| 1,804,983 | Higgins | May 12, 1931 |
| 1,915,641 | Antoine | June 27, 1933 |
| 2,028,630 | Stark | Jan. 21, 1936 |
| 2,055,707 | Rippl | Sept. 29, 1936 |
| 2,106,042 | Stark | Jan. 18, 1938 |
| 2,139,523 | Smith | Dec. 6, 1938 |
| 2,139,524 | Smith | Dec. 6, 1938 |
| 2,147,937 | Thompson | Feb. 21, 1939 |
| 2,347,526 | Truesdell | Apr. 25, 1944 |